US012502724B2

United States Patent
Okizaki et al.

(10) Patent No.: US 12,502,724 B2
(45) Date of Patent: Dec. 23, 2025

(54) WELDING CONTROL DEVICE, WELDING ROBOT SYSTEM, AND WELDING CONTROL METHOD

(71) Applicant: Hitachi, Ltd., Tokyo (JP)

(72) Inventors: Naoya Okizaki, Tokyo (JP); Akihide Tanaka, Tokyo (JP); Kazutoshi Sugie, Tokyo (JP); Naoki Morihira, Tokyo (JP); Isamu Takahashi, Tokyo (JP); Xudong Zhang, Tokyo (JP); Seunghwan Park, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 832 days.

(21) Appl. No.: 17/789,085

(22) PCT Filed: Oct. 14, 2020

(86) PCT No.: PCT/JP2020/038800
§ 371 (c)(1),
(2) Date: Jun. 24, 2022

(87) PCT Pub. No.: WO2021/131251
PCT Pub. Date: Jul. 1, 2021

(65) Prior Publication Data
US 2023/0041258 A1 Feb. 9, 2023

(30) Foreign Application Priority Data
Dec. 26, 2019 (JP) ................. 2019-237006

(51) Int. Cl.
*B23K 9/095* (2006.01)
*B25J 11/00* (2006.01)
(52) U.S. Cl.
CPC ........... *B23K 9/0956* (2013.01); *B25J 11/005* (2013.01)

(58) Field of Classification Search
CPC .... B23K 9/095; B23K 9/0953; B23K 9/0956; B23K 9/1087; B25J 11/005; B25J 9/1664; B25J 9/1671; B25J 9/1697; B25J 19/026
See application file for complete search history.

(56) References Cited

U.S. PATENT DOCUMENTS 7,605,347 B2 * 10/2009 Izawa ................... B23K 9/127
901/42
9,919,427 B1 * 3/2018 Guilbert ................ B25J 9/1664
(Continued)

FOREIGN PATENT DOCUMENTS

EP 3 417 976 A1 12/2018
JP 61-195786 A 8/1986
(Continued)

OTHER PUBLICATIONS

International Search Report (PCT/ISA/210) issued in PCT Application No. PCT/JP2020/038800 dated Dec. 15, 2020 with English translation (five (5) pages).
(Continued)

*Primary Examiner* — Brian W Jennison
(74) *Attorney, Agent, or Firm* — Crowell & Moring LLP

(57) ABSTRACT

A master unit includes a welding DB in which prescribed motion data associated with an object to be welded is stored, a state sensor which measures, as welding state data, a situation of welding by a robot which executes welding in a real environment according to the prescribed motion data, a simulated environment which imitates the real environment and notifies a worker of the welding state data, and a motion control unit which receives, as an input, worker motion data indicating a motion of welding by the worker from the simulated environment, operates the robot in the real environment by using the worker motion data instead of the prescribed motion data, and records, as new prescribed
(Continued)

motion data, the input worker motion data in the welding DB.

10 Claims, 10 Drawing Sheets

(56) References Cited

U.S. PATENT DOCUMENTS

| | | | | |
|---|---|---|---|---|
| 10,442,025 | B2* | 10/2019 | Jones | B23K 37/0288 |
| 10,828,716 | B2* | 11/2020 | Muzilla | B25J 9/1689 |
| 11,645,936 | B2* | 5/2023 | Becker | G09B 5/02 |
| | | | | 434/234 |
| 11,724,388 | B2* | 8/2023 | Yoshida | G06T 19/006 |
| | | | | 700/245 |
| 2009/0298024 | A1* | 12/2009 | Batzler | G09B 5/00 |
| | | | | 434/234 |
| 2011/0224815 | A1* | 9/2011 | Sonner | B25J 9/1664 |
| | | | | 700/97 |
| 2014/0014637 | A1* | 1/2014 | Hunt | B25J 9/1689 |
| | | | | 219/124.22 |
| 2016/0114418 | A1* | 4/2016 | Jones | B23K 9/1087 |
| | | | | 219/124.1 |
| 2016/0175964 | A1* | 6/2016 | Penoyer | B23K 9/0956 |
| | | | | 219/137 R |
| 2016/0267806 | A1* | 9/2016 | Hsu | B23K 9/0956 |
| 2018/0361493 | A1* | 12/2018 | Muzilla | B25J 9/1689 |
| 2020/0101599 | A1* | 4/2020 | Yoshida | B25J 9/1697 |

FOREIGN PATENT DOCUMENTS

| | | |
|---|---|---|
| JP | 5-305590 A | 11/1993 |
| JP | 9-76063 A | 3/1997 |
| JP | 2000-176675 A | 6/2000 |
| JP | 2007-219989 A | 8/2007 |

OTHER PUBLICATIONS

Japanese-language Written Opinion (PCT/ISA/237) issued in PCT Application No. PCT/JP2020/038800 dated Dec. 15, 2020 (five (5) pages).

Extended European Search Report issued in European Application No. 20905664.7 dated Dec. 14, 2023 (8 pages).

* cited by examiner

WELDING CONTROL DEVICE, WELDING ROBOT SYSTEM, AND WELDING CONTROL METHOD

TECHNICAL FIELD

The present invention relates to a welding control device, a welding robot system, and a welding control method.

BACKGROUND ART

A metal welding technique by arc welding is used for producing products in construction machines, trains, buildings, power plants, and the like. In an arc welding work, there are many works manually performed by a worker by manual welding or semi-automatic welding, but the quality of the product greatly depends on the skill of the worker. As skilled workers decrease, the quality of the product cannot be maintained. As a problem to solve these problems, a welding robot is being introduced into a factory that manufactures the products in order to improve productivity of the welding work. The welding robot automatically performs the welding work by reading motion data in which welding conditions such as motions of a welding torch are defined in advance and moving the welding torch according to the motion data. Accordingly, a preliminary preparation called "teaching" for setting (teaching) the motion data in the welding robot is required before the welding robot is moved.

Teaching is roughly classified into two types of (1) off-line teaching and (2) direct teaching.

(1) The off-line teaching is a method for automatically calculating motion data for welding a product from shape data of a product or the like without requiring a manual work by a worker. PTL 1 describes, as an example of the off-line teaching, a method for generating optimum motion information of a welding torch in which a difference of a welding torch with respect to a reference posture is small and a posture change amount is small.

However, in the off-line teaching, since only simple settings such as a welding speed and a welding height are supported, it is not possible to perform a highly accurate motion such as moving at an accuracy of 1 mm or less according to a state of a molten pool. In the arc welding, it is necessary to perform a torch motion with an accuracy of 1 mm or less while grasping a state of a welded portion.

Thus, (2) the direct teaching is a method for directly recording motion data by actually moving a welding torch by hand of a worker. PTL 2 describes, as an example of the direct teaching, a method for storing a motion in a robot by directly holding and moving a hand of the robot or a tool by the hand of the worker.

Although the direct teaching in which the motion of the worker is directly reflected in a program of the robot is more costly than the off-line teaching, it is possible to record highly accurate motion data, and it is possible to flexibly teach conditions even though a shape of a welded body changes complicatedly.

CITATION LIST

Patent Literature

PTL 1: JP 2007-219989 A
PTL 2: JP H05-305590 A

SUMMARY OF INVENTION

Technical Problem

The teaching of the welding work by simulating the motions of the skilled workers has a plurality of problems.

During the arc welding, since the welded portion emits strong arc light, it is necessary to attach a light shielding surface, and the worker cannot see anything other than the vicinity of the molten pool. In the direct teaching in which the welding is performed while observing the molten pool through the arm of the robot, since the arm of the robot blocks a field of view, it is not suitable to reproduce a motion of 1 mm or less by moving the vicinity of the molten pool by a minute amount.

A person skilled in semi-automatic welding who moves and operates a torch by hand has a technique of normally performing a welding state unconsciously by dark cognition which is difficult to quantify. In the direct teaching that is greatly different from an actual work of the semi-automatic welding, it is difficult to reflect dark cognition that is difficult to quantify and verbalize in teaching.

Accordingly, a main object of the present invention is to realize welding robot teaching reflecting dark cognitive motion of a worker.

Solution to Problem

In order to solve the above problems, a welding control device of the present invention has the following features.

The present invention provides a welding control device including a welding DB in which prescribed motion data associated with an object to be welded is stored, a state sensor which measures, as welding state data, a situation of welding by a robot which executes welding in a real environment according to the prescribed motion data, a simulated environment which imitates the real environment and notifies a worker of the welding state data, and a motion control unit which receives, as an input, worker motion data indicating a motion of welding by the worker from the simulated environment, operates the robot in the real environment by using the worker motion data instead of the prescribed motion data, and records, as new prescribed motion data, the input worker motion data in the welding DB.

Other means will be described later.

Advantageous Effects of Invention

According to the present invention, it is possible to realize the welding robot teaching reflecting the dark cognitive motion of the worker.

DESCRIPTION OF EMBODIMENTS

In the present invention, direct teaching in a simulated environment in which a measurement result in a real environment where a robot is welding is displayed in real time in an operation environment of a worker and an environment close to actual welding can be notified to the worker is studied instead of performing direct teaching in a real environment of product production. In the simulated environment in which a situation in which the robot is actually welding is notified in real time, the worker can grasp a situation with higher accuracy than off-line teaching by simulation. The worker can move a simulated torch without hindering recognition of an arm position of the robot by actual work arc light and a light shielding surface, instead of moving an actual arm of the robot by grasping the arm by hand.

Hereinafter, an embodiment of the present invention will be described with reference to the drawings.

Figure 1:
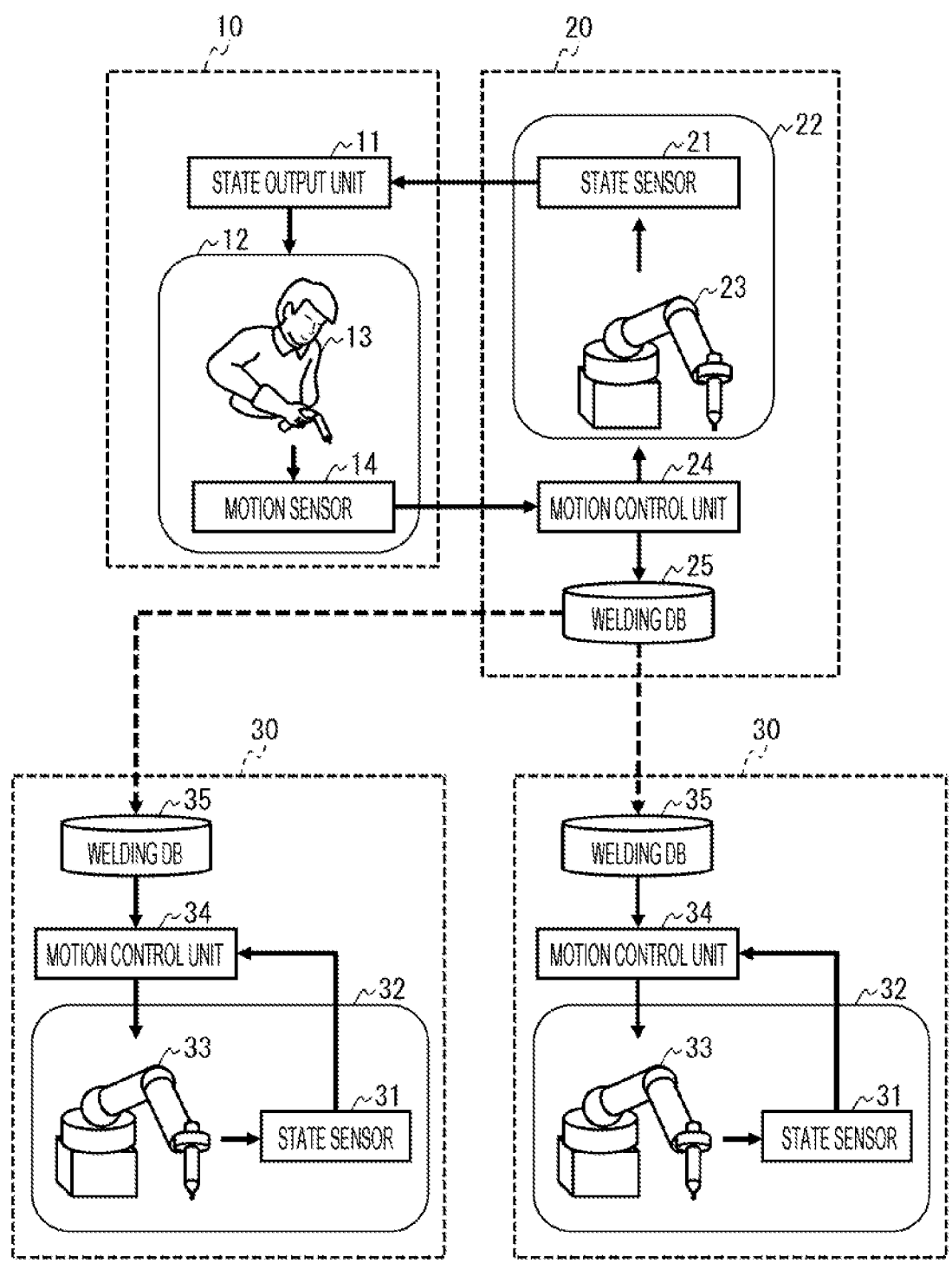
FIG. 1 is a functional diagram of a welding robot system according to an embodiment of the present invention.

FIG. 1 is a functional diagram of a welding robot system.

The welding robot system includes a simulation unit 10 that is a teaching side, a master unit 20 that is a taught side, and subsystem units 30 that perform welding based on a welding program created by the master unit 20.

As will be described later with reference to FIGS. 7 to 9, a worker 13 who is a living human works in a simulated environment 12. The simulation unit 10 where the worker 13 is present includes a state output unit 11 and a motion sensor 14 in the simulated environment 12.

As will be described later with reference to FIGS. 10 and 11, a robot 23 as a machine works in a real environment 22. The real environment 22 is a place where welding is actually performed, and the simulated environment 12 is a virtual environment imitating the real environment 22. The master unit 20 where the robot 23 is present includes a state sensor 21 in the real environment 22, a motion control unit 24, and a welding DB 25.

The master unit 20 may not include the welding DB 25 therein, and instead, may have a configuration substantially equivalent to a configuration in which the master unit 20 includes the welding DB 25 by having a function of being able to access the welding DB 25 present over an external cloud.

The state output unit 11 outputs (screen display, sound output, or the like) welding state data such as a molten pool shape of a welded portion and a formed bead measured by the state sensor 21 in the real environment 22 to the worker 13 in real time as the simulated environment 12, and thus, the simulated environment as if the worker 13 is present in the real environment 22 is monitored. When the worker 13 performs teaching such as moving the simulated torch in the simulated environment 12 being monitored, worker motion data is measured by the motion sensor 14 and is transmitted to the master unit 20.

The motion control unit 24 causes the robot 23 to read the received worker motion data as welding motion data in real time. As a result, the robot 23 is caused to perform a welding work as if the worker 13 remotely operates the robot 23 in the real environment 22.

The master unit 20 (state sensor 21, motion control unit 24, and welding DB 25) is constituted by a computer including a central processing unit (CPU), a memory, storage means (storage unit) such as a hard disk, and a network interface.

In this computer, the CPU executes a program (also referred to as an application or an app for short) read on the memory to move a control unit (control means) constituted by each processing unit.

The welding motion data associated with an object to be welded is stored, as the welding program, in the welding DB 25. This welding motion data is obtained by recording, as digital data, the worker motion data taught by the worker 13 in the simulated environment 12. Thereafter, the welding motion data in the welding DB 25 is read as prescribed motion data when the robot 23 reproduces a motion taught in the real environment 22. That is, the motion control unit 24 controls the robot 23 by switching between the following two modes.

(1) Automatic mode: A mode for controlling the robot 23 in accordance with prescribed motion data set in the welding DB 25 in the past.

(2) Manual mode: A mode of controlling the robot 23 in accordance with worker motion data input in real time. In this manual mode, in addition to a control process of the robot 23, a recording process of the welding DB 25 is also performed in parallel.

Similarly to the master unit 20, the subsystem unit 30 in which a robot 33 works in a real environment 32 also includes a state sensor 31, a motion control unit 34, and a welding DB 35. As a welding program recorded in the welding DB 35, the welding program in the welding DB 25 received from the master unit 20 is written (dashed line arrow in FIG. 1). That is, the welding program taught by the master unit 20 is loaded in mass production type subsystem units 30 (at many locations).

The state sensor 31 is the same as the state sensor 21 in that the welding state data is observed and is used to control the robot 33 by the corresponding welding motion data in the welding program. On the other hand, since the subsystem unit 30 is not directly taught from the simulation unit 10, the welding state data of the state sensor 31 is not transmitted to the simulation unit 10.

The motion control unit 34 manufactures a real product according to the welding program in the welding DB 35. As a result, a manufacturing line in which welding can be performed by the same movement as the worker motion data of the worker 13 is completed.

Figure 2:
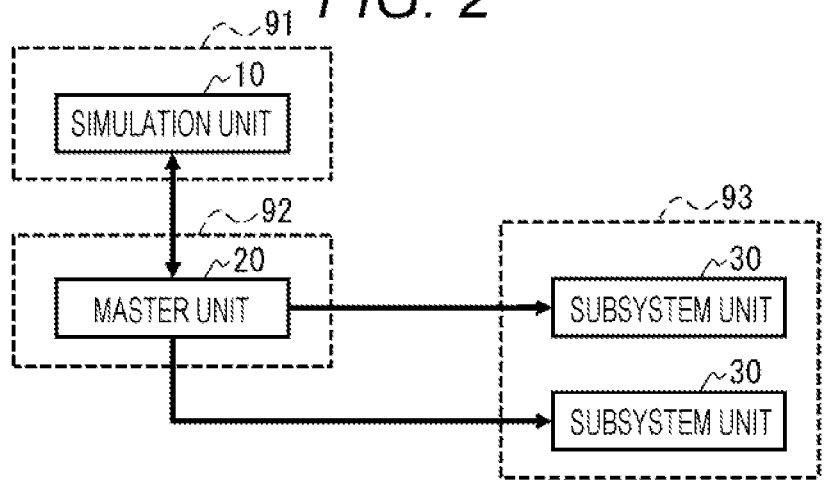
FIG. 2 is a configuration diagram illustrating a first example of a factory to which the welding robot system according to the embodiment of the present invention is applied.
Figure 3:
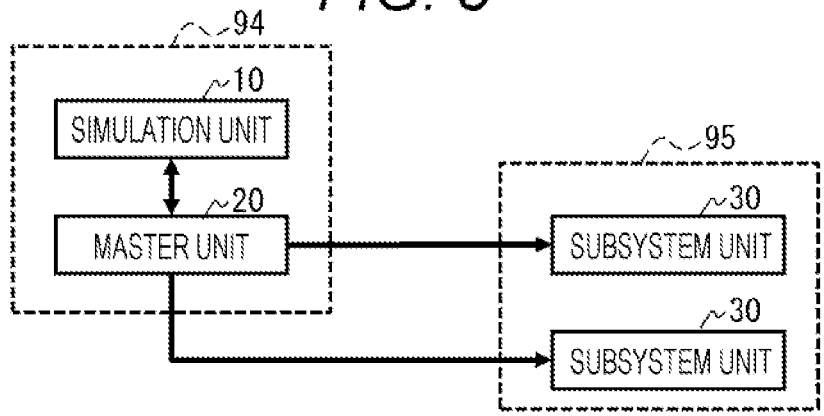
FIG. 3 is a configuration diagram illustrating a second example of the factory to which the welding robot system according to the embodiment of the present invention is applied.
Figure 4:
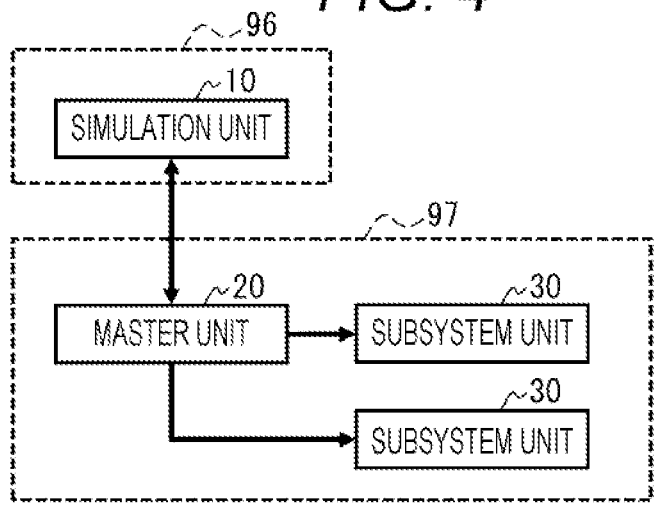
FIG. 4 is a configuration diagram illustrating a third example of the factory to which the welding robot system according to the embodiment of the present invention is applied.

Hereinafter, as illustrated in FIGS. 2 to 4, the welding robot system is applied to various factories.

FIG. 2 is a configuration diagram illustrating a first example of a factory to which the welding robot system is applied.

A factory 91 accommodating the simulation unit 10, a factory 92 accommodating the master unit 20, and a factory 93 accommodating the subsystem unit 30 are separate factories. Each factory may be run by a separate business operator.

As a result, direct teaching is performed across a network between the factory 91 and the factory 92 in a remote location, and thus, it is not necessary to dispatch the worker 13 in the factory 91 to the factory 92 or the factory 93 in the remote location whenever the manufacturing line configuration changes. The factories 91 to 93 may be located in one country or in different countries.

With such a configuration, the business operator of the factory 91 is easy to provide a service for setting motion data of the factory 92. The business operator of the factory 92 can entrust the business operator of the factory 93 with manufacturing.

FIG. 3 is a configuration diagram illustrating a second example of the factory to which the welding robot system is applied.

A factory 94 accommodating the simulation unit 10 and the master unit 20 and a factory 95 accommodating the subsystem unit 30 are separate factories. The simulation unit 10 and the master unit 20 are run by the same business operator.

As a result, since the teaching is completed in the factory 94, it is not necessary to transfer more technical information than necessary to the remote location or the factory 95 outside the country, and information management is easy.

FIG. 4 is a configuration diagram illustrating a third example of the factory to which the welding robot system is applied.

A factory 96 accommodating the simulation unit 10 and a factory 97 accommodating the master unit 20 and the subsystem unit 30 are separate factories. The master unit 20 and the subsystem unit 30 are run by the same business operator.

As a result, since two types of real environments 22 and 32 can be aggregated in one factory 97, the facility cost of the factory can be reduced.

Figure 5:
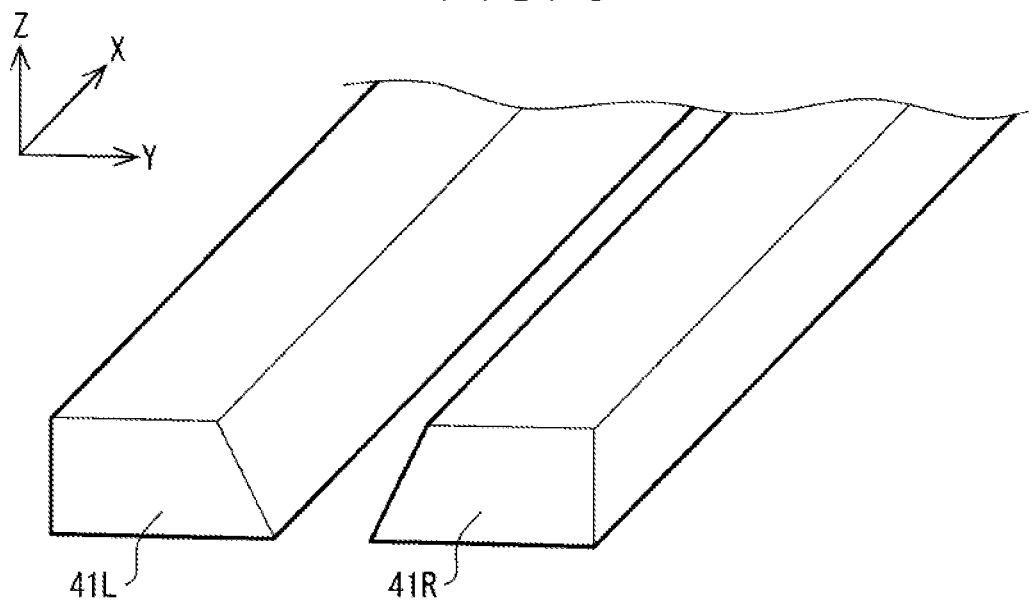
FIG. 5 is a perspective view of a base material to be welded according to the embodiment of the present invention.

FIG. 5 is a perspective view of base materials 41L and 41R to be welded. A V-shaped space is present as a groove between the base materials 41L and 41R.

Figure 6:
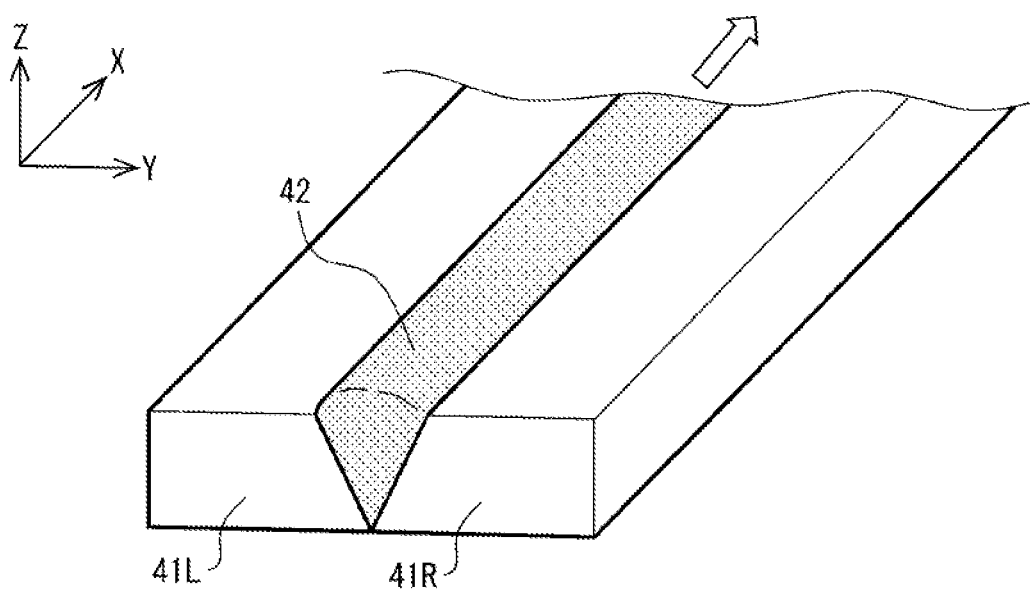
FIG. 6 is a perspective view when a bead is poured into a groove of the base material of FIG. 5 according to the embodiment of the present invention.

FIG. 6 is a perspective view when a bead 42 is poured into the groove of the base materials 41L and 41R in FIG. 5. Hereinafter, a proceeding direction (arrow) of welding in which the bead 42 flows is defined as an X axis, left and right lateral sides with respect to the proceeding direction are defined as a Y axis, and a height direction of the base materials 41L and 41R is defined as a Z axis.

Figure 7:
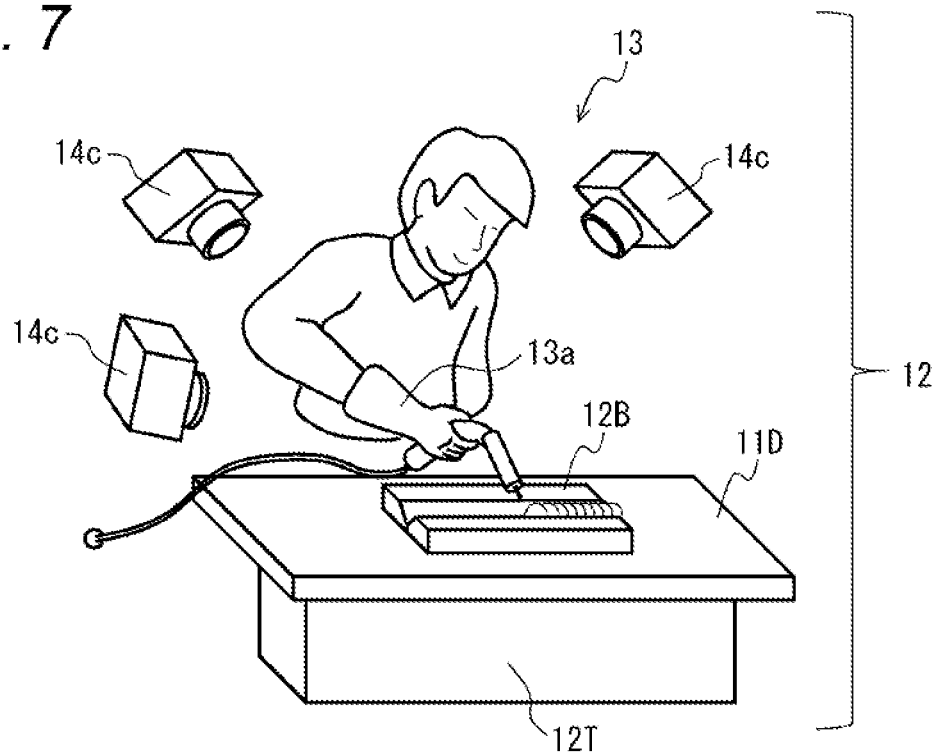
FIG. 7 is an external view of a worker who performs a simulation work for acquiring motion data in a simulation unit according to the embodiment of the present invention.

FIG. 7 is an external view of the worker 13 who performs a simulation work for acquiring the motion data in the simulation unit 10.

Figure 9:
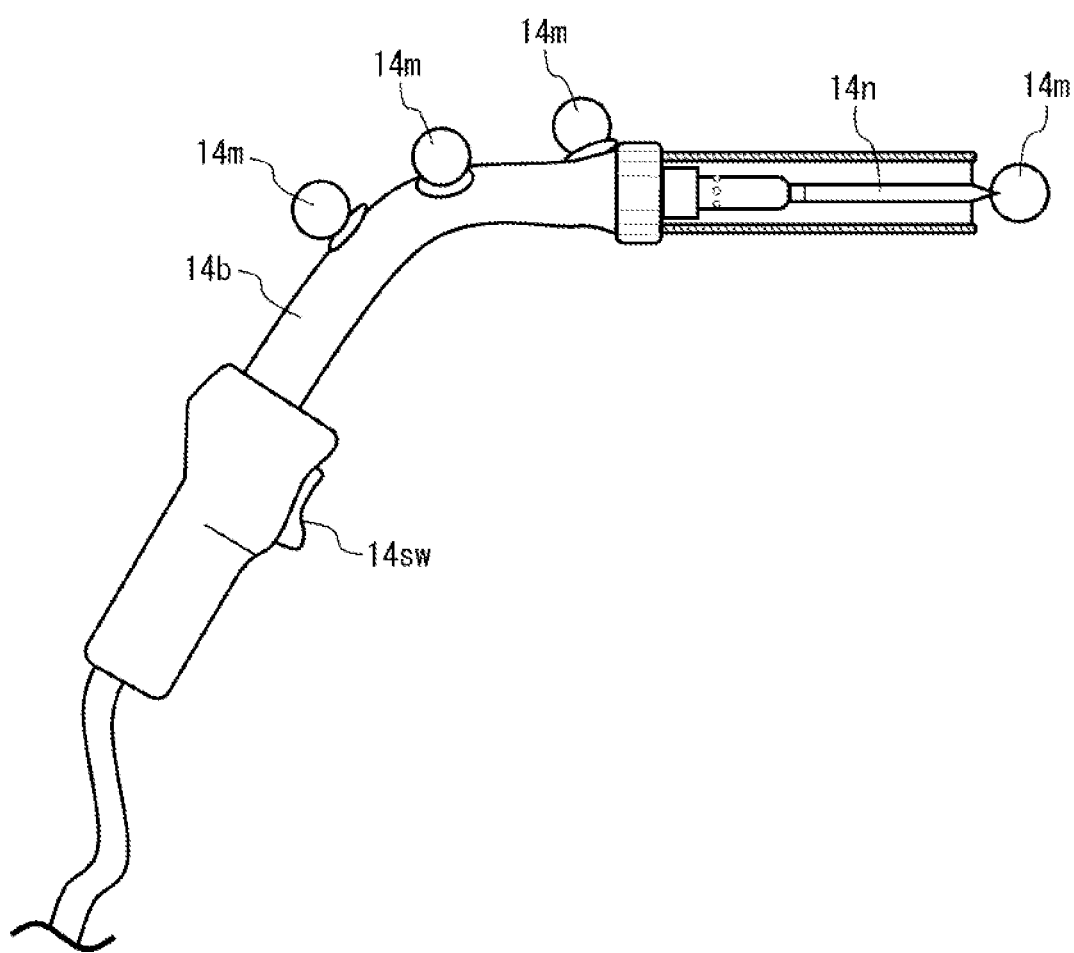
FIG. 9 is a configuration diagram of a simulated torch gripped by the worker according to the embodiment of the present invention.

The worker 13 grips a simulated torch 14b of FIG. 9 with an arm 13a of the worker and performs a welding motion as if the simulated torch is an actual welding torch.

In FIG. 7, a virtual welding situation 12B corresponding to an actual welding situation of the master unit 20 is displayed on an upper surface of a welding table 12T as the simulated environment 12 perceived by the worker 13. The state output unit 11 is, for example, a flat display 11D disposed on the upper surface of the physical welding table 12T, and the simulated environment 12 is embodied by the display 11D displaying the virtual welding situation 12B. Alternatively, the state output unit 11 disposes an object to be welded (or a model thereof) on the upper surface of the physical welding table 12T, and projects a video obtained by capturing the bead during actual welding on the object to be welded by using projection mapping. Thus, the simulated environment 12 is embodied. The virtual welding situation 12B can be displayed in an enlarged or reduced size even with the same size as the actual welding, and can be adjusted according to the object to be welded.

FIG. 7 illustrates a motion camera 14c as the motion sensor 14. The motion camera 14c detects the motion of the worker or the simulated torch 14b and measures data of the welding motion.

Figure 8:
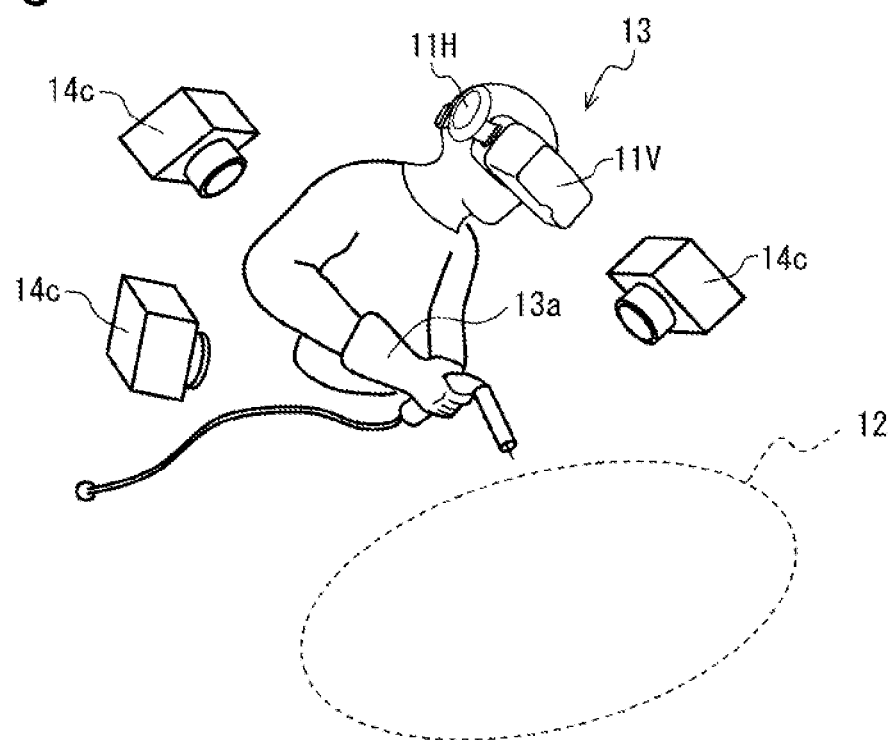
FIG. 8 is a diagram for describing another configuration of a simulated environment perceived by the worker according to the embodiment of the present invention.

FIG. 8 is a diagram for describing another configuration of the simulated environment 12 perceived by the worker 13. FIG. 8 is an external view of a case where the welding table 12T and the display 11D for displaying the virtual welding situation are replaced with a headphone 11H and a VR goggle 11V and the worker 13 wears the headphone and the VR goggle.

The VR goggle 11V as the state output unit 11 virtually forms the simulated environment 12 (see FIG. 1) in a space in front of the worker 13. The worker 13 visually recognizes as if the welding table, the base materials, and the bead are present even in a space where nothing is physically present. In accordance with an operation of the simulated torch by the worker, an arc or a laser emitted from the welding torch may be displayed together. The headphone 11H as the state output unit 11 causes the worker 13 to listen to the sound of the real environment 22, and thus, the worker is caused to recognize the simulated environment 12 not only visually but also audibly.

FIG. 9 is a configuration diagram of the simulated torch 14b gripped by the worker 13.

Simulated torch markers 14m which are targets of which 3D coordinates are measured by the motion camera 14c are added to the simulated torch 14b. In order to measure the 3D coordinates of a swing width and height of a simulated torch tip 14n, it is desirable that the simulated torch markers 14m are particularly added to the simulated torch tip 14n.

As a result, the motion of the arm 13a of the worker can be measured as the worker motion data. As means for measuring the worker motion data, an acceleration sensor or a mechanical sensor may be attached to the simulated torch 14b, or a kinect (registered trademark) sensor capable of performing posture recognition from a captured image of the arm 13a of the worker may be used.

The simulated torch 14b includes a simulated torch switch 14sw. The worker 13 starts a recording period (manual mode) of the worker motion data when the simulated torch switch 14sw is turned on, and ends the recording period of the worker motion data when the simulated torch switch 14sw is turned off.

As described above, an operation for turning on and off the recording of the worker motion data is received from the simulated torch switch 14sw, and thus, the worker 13 can give an instruction about teaching in the same manner as a familiar operation of emitting an arc with an actual torch that is not simulation.

Figure 10:
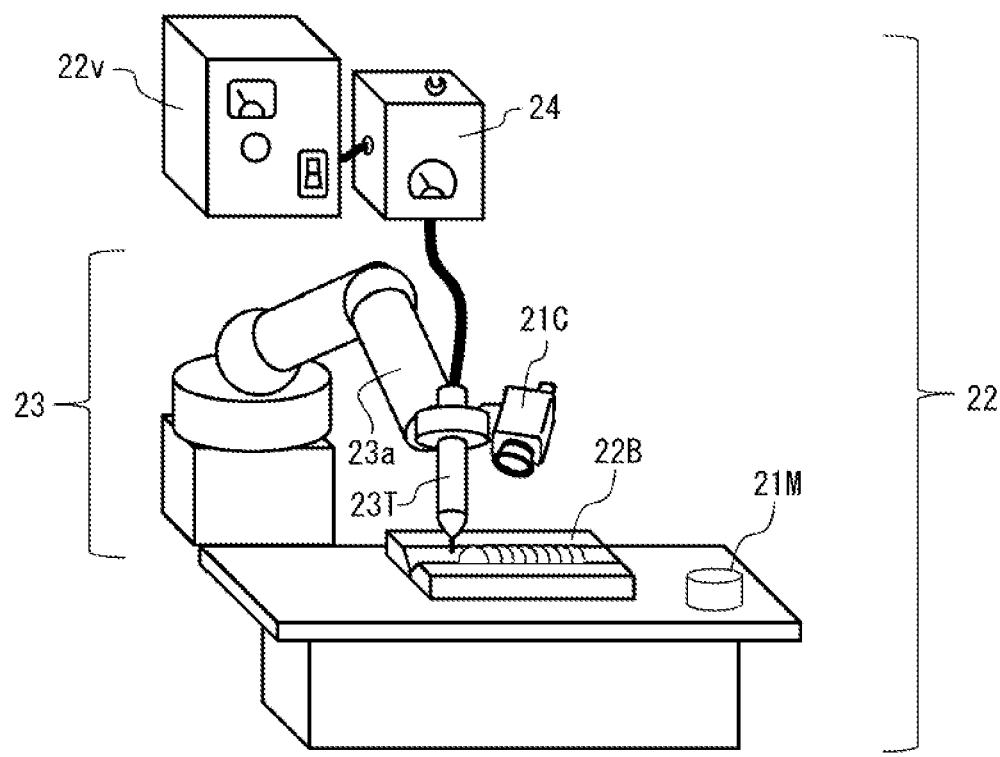
FIG. 10 is an external view of a robot moving in a master unit according to the embodiment of the present invention.

FIG. 10 is an external view of the robot 23 moving in the master unit 20.

The robot 23 in the real environment 22 moves a robot arm 23a in response to power supply from a robot power supply 22v and the welding motion data from the motion control unit 24, and performs arc welding in an actual welding situation 22B for an actual base material and bead by using a robot torch 23T attached to the robot arm 23a.

As the state sensor 21 for measuring the welding state data from the actual welding situation 22B, a molten pool camera 21C for capturing an image of a molten pool of the bead and outputting the captured image to the VR goggle 11V and the like, and a sound sensor 21M for collecting welding sound and outputting the collected sound to the headphone 11H are provided. In the actual welding situation 22B, since strong arc light is generated by the arc welding, it is desirable to mount a light shielding filter for capturing the molten pool without capturing the arc light to the molten pool camera 21C.

Figure 11:
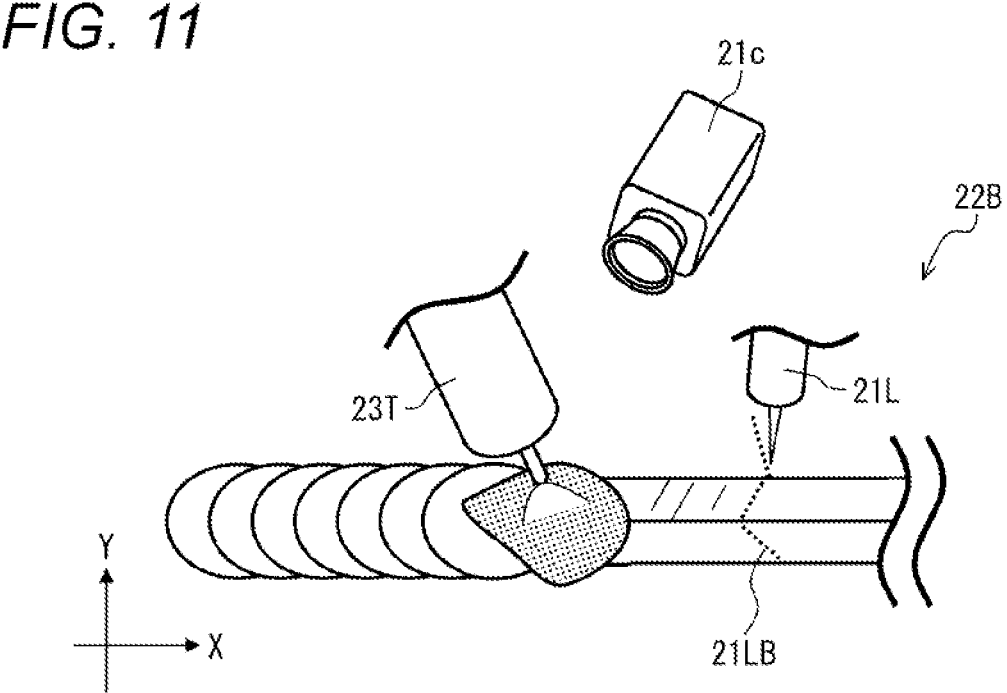
FIG. 11 is a detailed external view of an actual welding situation in FIG. 10 according to the embodiment of the present invention.

FIG. 11 is a detailed external view of the actual welding situation 22B in FIG. 10.

The molten pool camera 21C is disposed near the robot torch 23T to such an extent that the robot torch 23T can capture a shape of the molten pool of the bead generated by the arc welding. As the state sensor 21 that measures the welding state data, a laser displacement meter 21L for measuring a shape of the welded portion by applying a laser beam 21LB to a location (welded portion) of the base material where welding is to be performed from now is also provided.

Figure 12:
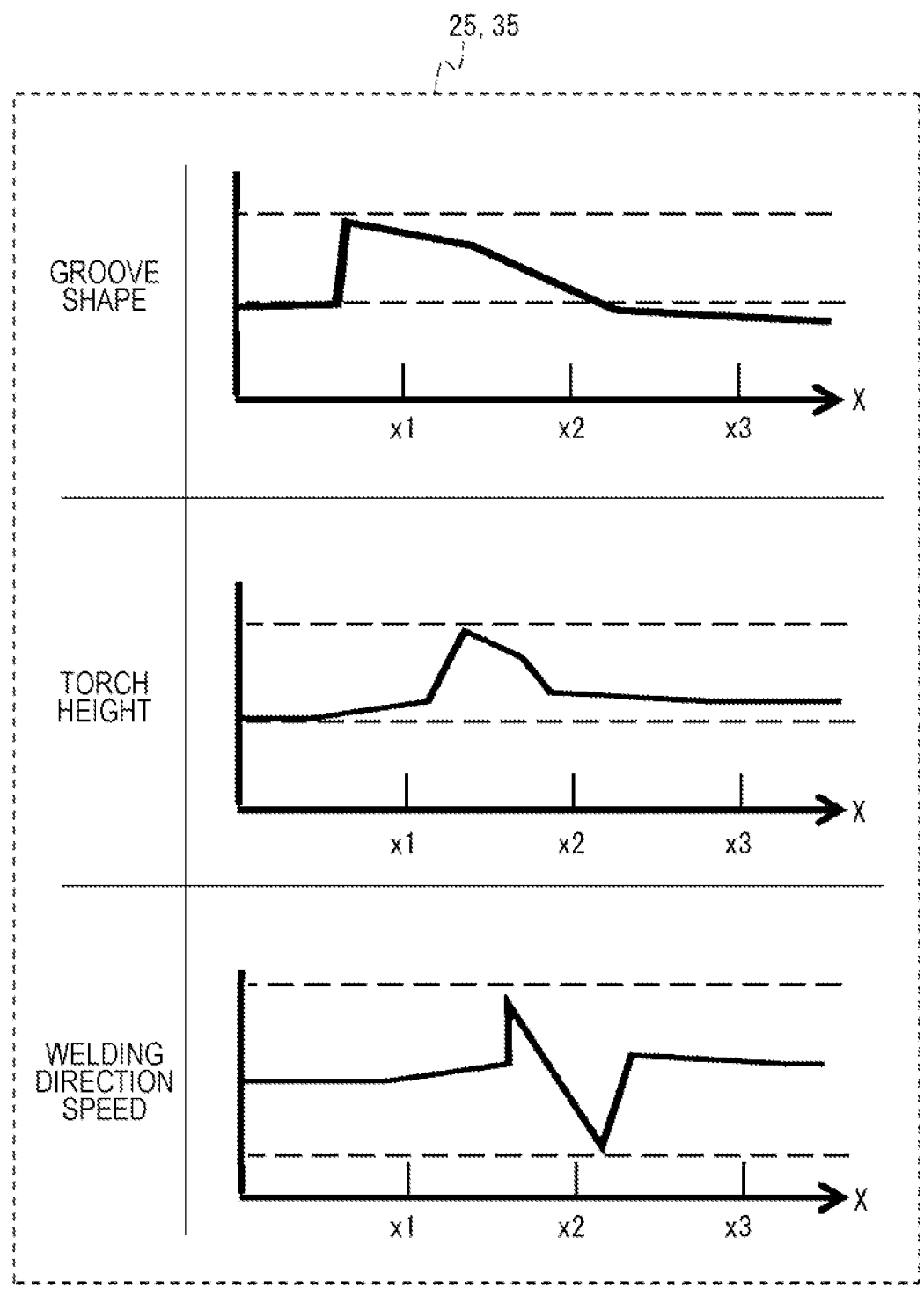
FIG. 12 is an explanatory diagram illustrating an example of a welding DB according to the embodiment of the present invention.

FIG. 12 is an explanatory diagram illustrating an example of the welding DBs 25 and 35. In each graph of FIG. 12, a horizontal axis corresponds to a traveling direction (X axis) of the bead, and a vertical axis indicates a feature value (groove shape, torch height, or welding direction speed) at each position of the X axis.

As described with reference to FIG. 1, the welding program is recorded in the welding DB 25, and the welding program associates the welding state data with the welding motion data suitable for the welding state data. That is, when certain welding state data is measured, the welding motion data associated as the welding program is adopted to move the robot 23. Thereafter, when another welding state data is measured, another welding motion data is read into the robot 23.

Although the term "welding program" is used for the description, the welding program is not limited to the welding program as long as the corresponding welding motion data can be obtained from the measured welding state data, and the welding program may be stored as a correlation function or correspondence data in the welding DB 25.

As the welding state data of the welding program, for example, shape data of the entire welding product, shape data of a welded portion pattern (groove shape in FIG. 12) which is a part of the welding product, and a feature value (luminance of the welded portion, heat input amount of the welded portion, size of the welded portion, gap width of the base material, groove angle of the base material, and the like) related to welding may be used. Alternatively, auditory information (welding sound, frequency distribution thereof, and the like) may be used as the welding state data. A plurality of pieces of welding state data may be combined and associated with the welding motion data.

Even when a new welding product is created for the first time by associating the welding motion data with each piece of information indicating the welding situation such as the welded portion pattern, a known welding portion pattern appears for each portion, and thus, the corresponding welding motion data can be obtained.

Examples of the welding motion data of the welding program include welding conditions such as the torch height and the welding direction speed in FIG. 12 when the robot arm 23a is moved. The coordinates such as the torch height are relative coordinates of the welding state data from the welded portion.

Figure 13:
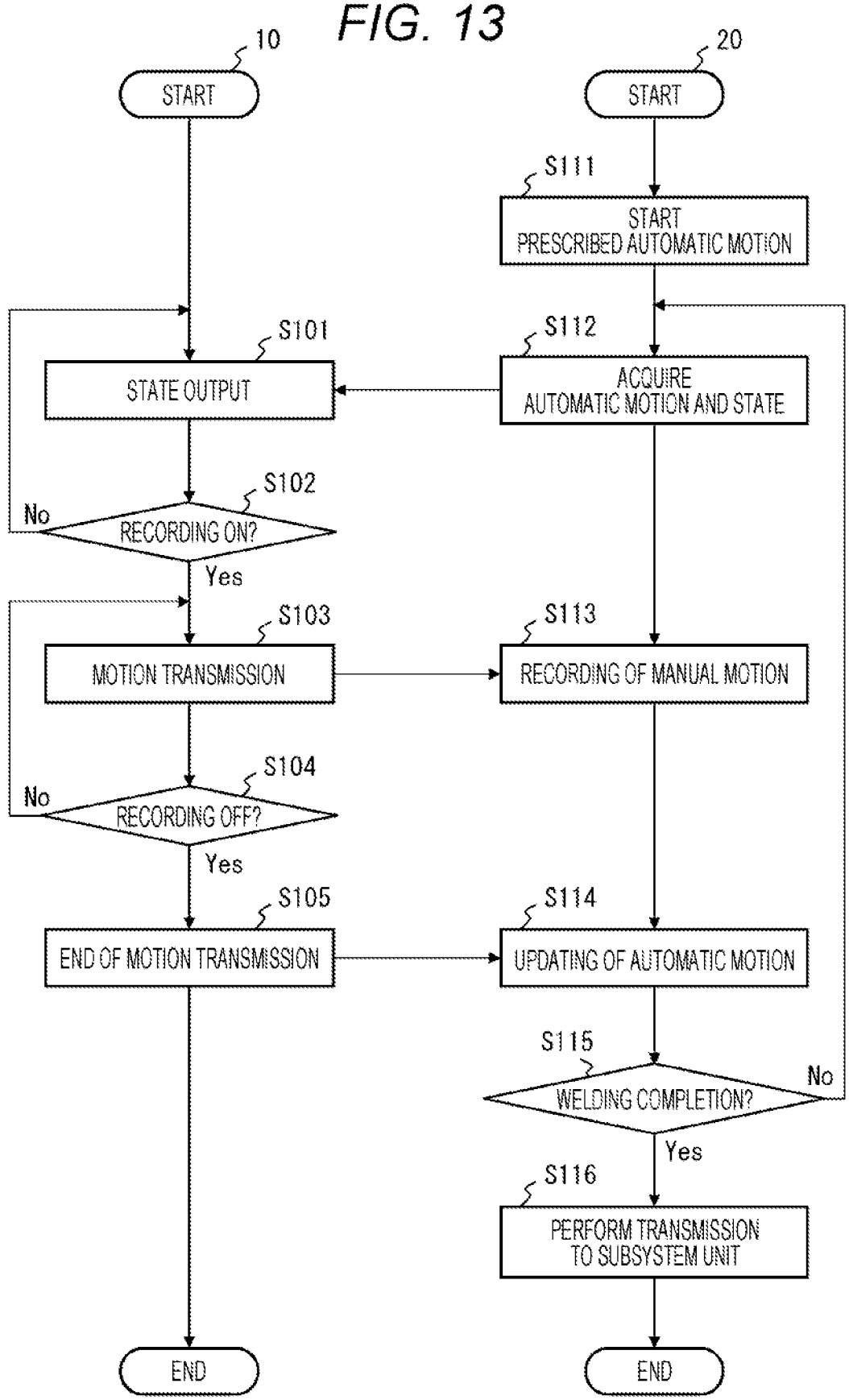
FIG. 13 is a flowchart illustrating a motion of the welding robot system according to the embodiment of the present invention.

FIG. 13 is a flowchart illustrating a motion of the welding robot system.

In S111, the motion control unit 24 of the master unit 20 starts automatic motion of the robot 23 in accordance with prescribed motion data read from the welding DB 25. As a result, the robot 23 performs the welding work in the real environment 22 even though the worker 13 does not explicitly perform the operation.

In S112, the state sensor 21 acquires the welding state data from the real environment 22 in which the robot is automatically moved in S111, and transmits the welding state data to the simulation unit 10.

In S101, the state output unit 11 of the simulation unit 10 outputs the received welding state data to the worker 13, and thus, the worker 13 is caused to monitor the welding state data of the actual welding situation 22B as the virtual welding situation 12B. The monitoring process in S112→S101 is continued until the welding is completed (S115, Yes).

Figure 14:
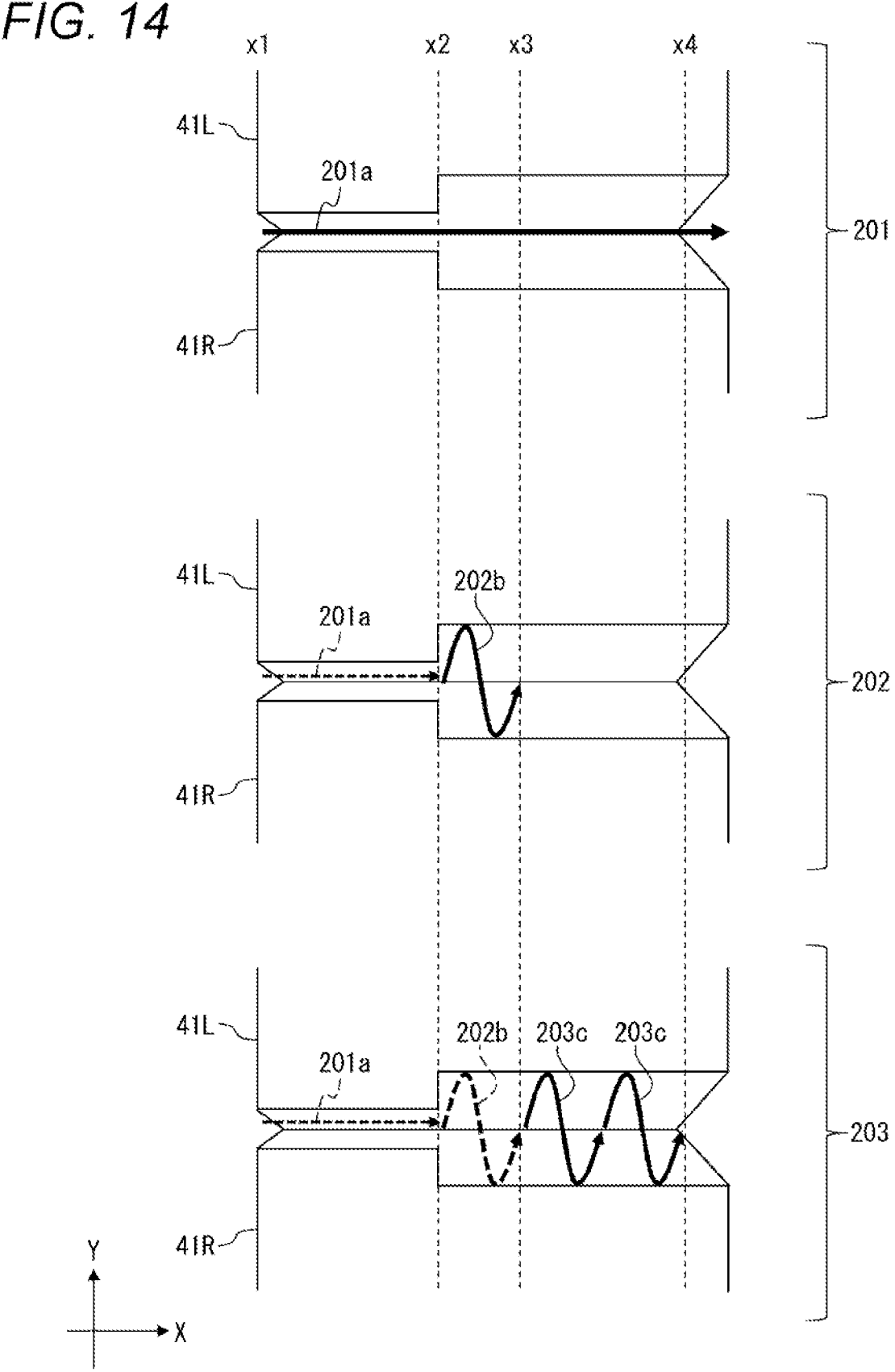
FIG. 14 is a top view illustrating a scene in which welding is performed on the base material of FIG. 5 according to the embodiment of the present invention.

FIG. 14 is a top view illustrating a scene in which the base materials 41L and 41R in FIG. 5 are welded. Welding proceeds in the order of first state 201→second state 201→third state 201 from the top of the drawing. The bead is formed from a welding start position x1 on a left side of the drawing to a welding end position x4 through intermediate positions x2 and x3.

First, in the first state 201, trajectory data 201a traveling straight in the center of the groove between the base materials 41L and 41R is read as the prescribed motion data. In accordance with the trajectory data 201a, the robot torch 23T travels to a section from x1 to x2 with a narrow groove (S102, No). However, since the intermediate positions x2 to x4 is a section where the groove is wide, if a straight bead is merely applied in accordance with the trajectory data 201a as it is, an unapplied portion occurs in the groove.

In S102 in FIG. 13, the worker 13 determines that the unapplied portion occurs with the straight prescribed motion data, and turns on the simulated torch switch 14sw (S102, Yes) to start recording the worker motion data. The worker 13 causes the motion sensor 14 to measure the worker motion data by moving the simulated torch 14b with the arm 13a of the worker.

The motion sensor 14 transmits the worker motion data to the master unit 20 (S103) to cause the motion control unit 24 to record the worker motion data in the welding DB 25 (S113) and move the robot torch 23T in accordance with the worker motion data.

In the second state 202 of FIG. 14, trajectory data 202b directly taught by the worker 13 is illustrated as the worker motion data. The trajectory data 202*b* is widely weaved (meandering) so as to correspond to a section from x2 to x3 where the groove is wide, and it is possible to eliminate the unapplied portion.

When it is determined that the weaving teaching is performed to some extent (here, one round trip of the groove), the worker 13 turns off the simulated torch switch 14*sw* (S104, Yes) to end the recording of the worker motion data.

The motion control unit 24 receives a notification that a process of transmitting the worker motion data from the simulation unit 10 ends (S105), and ends a process of recording the worker motion data in the welding DB 25 in S113. As a result, the prescribed motion data for automatic motion in the section from x2 to x3 where the groove is wide is updated from the straight trajectory data 201*a* in the first state 201 to the weaved trajectory data 202*b* in the second state 202 (S114).

Since a section from x3 to x4 not yet welded remains, the welding is not completed (S115, No), and the automatic motion of S112 is continued. Here, in the third state 203 in FIG. 14, since the section from x3 to x4 has the same welding state data as the section from x2 to x3 where the teaching is completed (section having a wide groove width), the trajectory data 202*b* is repeatedly reproduced as trajectory data 203*c*.

That is, since the worker 13 may actually perform the direct teaching only in the partial section from x2 to x3 of a section from x1 to x4, a physical burden on the worker 13 using the simulated environment 12 can be reduced.

When the welding is completed (S115, Yes), the motion control unit 24 stores the welding program in which the welding state data and the welding motion data are associated with each other in the welding DB 25. The teaching process in S111 to S115 may be performed once on the base material (test piece). On the other hand, a process of updating the welding program is repeated by a plurality of teaching processes, and thus, quality improvement can be expected as the worker 13 gradually improves the welding program.

The created welding program is transmitted from the master unit 20 to the subsystem unit 30 (S116), and is used for automatic motion by the robot 33 in the subsystem unit 30.

When the robot 33 produces the same product from each of the plurality of base materials, in a case where all a plurality of products can be fixed to the same position without deviation in the arrangement of the base materials in the real environment 32, one piece of welding motion data associated with the same object to be welded may be reused from the welding DB 25.

However, even when the same product is actually produced in the same real environment 32, a slight positional deviation occurs in each product due to tolerances of parts, an influence of pre-welding work, and the like. The influence of the pre-welding work is, for example, a case where the shape of the welded portion at the groove slightly deviates from the welding program of the welding DB 25 due to tack welding or the like.

Thus, the motion control unit 24 of the master unit 20 may record not only the relative coordinates of the welded portion and the torch but also a welding phenomenon such as the size of the molten pool and may reflect the welding phenomenon in the prescribed motion data. Thus, the motion control unit 24 analyzes the molten pool shape and the welding sound acquired by the state sensor 21, extracts various feature values, and records the extracted feature values in the welding DB 25 together with the worker motion data transmitted from the simulation unit 10. The motion control unit 24 may also set a predetermined numerical range for various feature values to be recorded in the welding DB 25.

The motion control unit 34 (second motion control unit) may extract the feature value of the welding state data obtained in the real environment 32 (second real environment), and may finely correct a three-dimensional motion of the robot 33 (second welding robot) in a direction in which the feature value approaches a predetermined numerical value when the extracted feature value exceeds the predetermined numerical range.

For example, the motion control unit 34 extracts, as the feature value of the welding state data, left-right area ratios of the molten pool from the captured image of the molten pool, and corrects the three-dimensional motion of the robot 33 such that the extracted left-right area ratios of the molten pool become equal.

Hereinafter, a specific example in which control is performed such that the left-right area ratios become equal will be described with reference to FIGS. 15 and 16.

Figure 15:
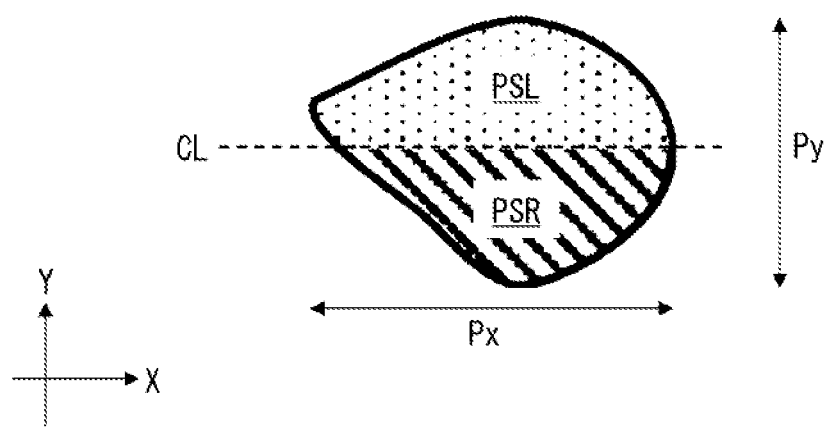
FIG. 15 is a plan view of a molten pool formed in a welded location of a bead according to the embodiment of the present invention.

FIG. 15 is a plan view of the molten pool formed at the welded location of the bead 42. In this plan view, an upper side of the Y axis is a left side with respect to the traveling direction (X-axis direction) of the bead. A left region PSL and a right region PSR of the molten pool are partitioned by a center line CL. The center line CL indicates a welding center position in the traveling direction of the bead. The molten pool has a length Px in the X-axis direction and a width Py in a Y-axis direction.

Here, as the welding state data for evaluating a left and right balance of the molten pool shape, symmetry Ssym of the molten pool is defined as follows.

$$Ssym=(PSL-PSR)/(PSL+PSR)=(PSL-PSR)/S$$

The smaller a value of the symmetry Ssym, the better the left and right balance and the higher the evaluation, and Ssym=0 is the most balanced state. S is an area of the entire molten pool.

Figure 16:
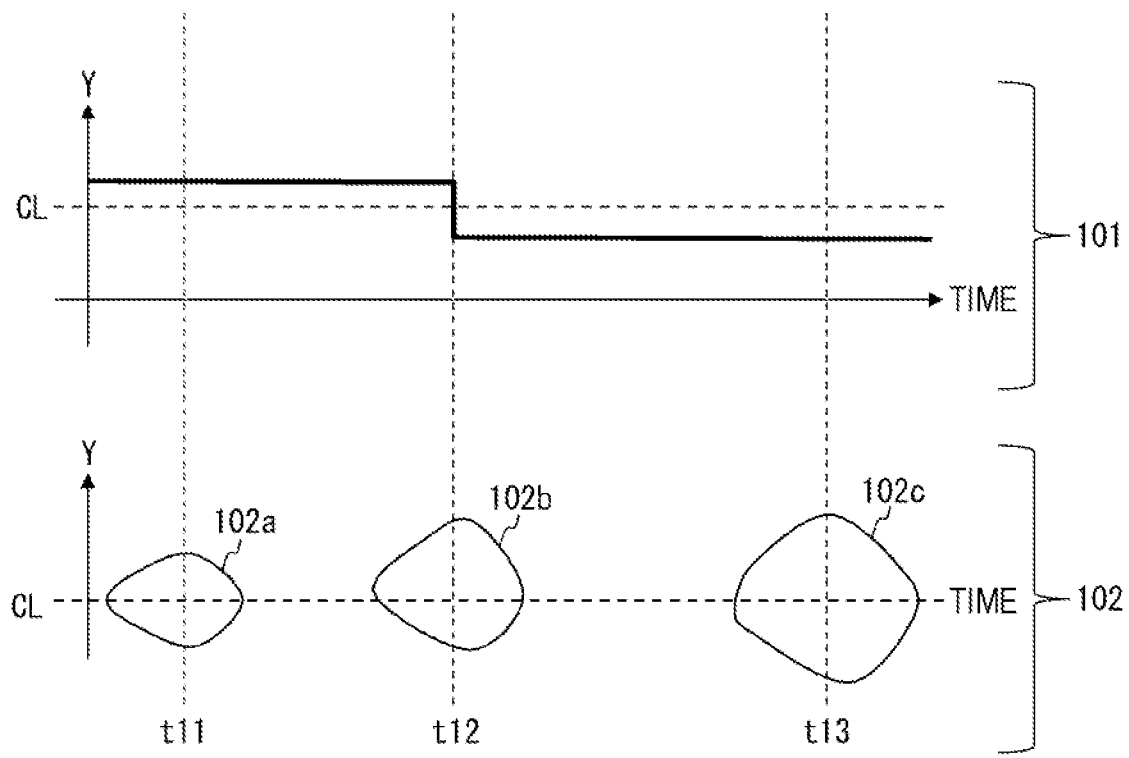
FIG. 16 is an explanatory diagram of a process of correcting a motion according to a shape of the molten pool according to the embodiment of the present invention.

FIG. 16 is an explanatory diagram of a process of correcting the motion according to the shape of the molten pool. A reference sign 101 denotes the welding motion data, and a reference sign 102 denotes the shape of the molten pool at each time.

A molten pool 102*a* at time t11 is in a state where the symmetry Ssym is good but the area S of the entire molten pool is small. Accordingly, in order to enlarge the molten pool 102*a*, the robot 33 maintains the position of the torch as it is.

In a molten pool 102*b* at time t12, although the area S of the entire molten pool is larger than the area of the molten pool 102*a*, the molten pool greatly bulges on a left side (an upper side of the Y axis), and the symmetry Ssym deteriorates.

Thus, the motion control unit 34 corrects the welding motion data denoted by reference sign 101 in which a position slightly above the center line CL is designated, and moves the torch of the robot 33 to a position slightly below the center line CL to improve the symmetry Ssym.

In a molten pool 102*c* at time t13, the symmetry Ssym is improved from the molten pool 102*b*, and the area S of the entire molten pool is sufficient.

As described above with reference to FIGS. 15 and 16, the motion control unit 34 of the subsystem unit 30 basically follows the prescribed motion data distributed from the master unit 20, but finely corrects the prescribed motion data within a range of the subsystem unit 30 independently of the prescribed motion data of the master unit 20. In other words, the prescribed motion data finely corrected by a certain subsystem unit 30 is local data that is not reflected in another subsystem unit 30 or the master unit 20.

That is, the motion control unit 34 of the subsystem unit 30 finely corrects only the prescribed motion data (dynamic program) for operating the robot 33 of the subsystem unit 30 that is not a monitoring target of the worker 13 while maintaining the prescribed motion data for moving the robot 23 of the master unit 20.

The state sensor 31 of the subsystem unit 30 extracts a feature value referred to in this fine correction process from the real environment 32. Examples of the feature value include the luminance of the molten pool, the shape of the molten pool, the area of the molten pool, a temperature of the welded portion, the heat input amount, and the welding sound in addition to the "left-right area ratio" illustrated in FIG. 15.

As an example in which the extracted feature value is maintained to fall within a specific range, the motion control unit 34 may perform control such that the molten pool area is not too wide but not too narrow but falls within a specific range, the luminance falls within a specific range, and the temperature falls within a specific range, in addition to the process of the "left-right area ratios become equal" illustrated in FIG. 16.

Since a threshold value for determining whether or not the feature value falls within the specific range varies depending on the material of the object to be welded or the like, the motion control unit 34 may appropriately receive setting of the threshold value.

In the present embodiment described above, the worker 13 of the simulation unit 10 monitors the welding work in the real environment 22 by the robot 23 of the master unit 20 in real time from the state sensor 21 (the molten pool camera 21C or the like) via the state output unit 11 (the VR goggle 11V or the like). The worker 13 operates the simulated torch 14b to reflect the worker motion data in the robot arm 23a and also reflect the worker motion data in the welding program in the welding DB 25.

As a result, the worker 13 can execute direct teaching across the network while operating the robot arm 23a as if the robot arm 23a is the arm 13a of the worker. It is possible to construct the simulated environment 12 close to the actual state to produce the welding robot program reflecting a dark cognitive motion of the worker 13.

The worker 13 can designate the recording period of the direct teaching by turning on and off the simulated torch switch 14sw. Accordingly, the worker 13 may not constantly operate the simulated torch 14b during the welding period, and may view the motion of the robot 23 according to already registered prescribed motion data in a scene where the intervention is unnecessary.

The welding robot system of the present embodiment in which the worker 13 of the simulation unit 10 and the robot 23 of the master unit 20 can execute direct teaching in close cooperation is particularly suitable for an application in which advanced skills of a skilled worker to be described below are reflected in the welding program.

Since the skilled worker has accumulated many years of experience and has acquired excellent welding skills, the skilled worker can finish welding with high quality even in large structures and welding works with complicated shapes. For example, the skilled worker creates a high-quality product by finely operating the welding torch with an accuracy of 1 mm or less while observing the shape of the molten pool having a diameter of about 1 cm in detail.

The skilled worker can empirically understand how to perform welding not only in typical welding operations in textbooks but also in products having forms to see for the first time. The skilled worker can also know how to perform recovery even in an unexpected abnormal situation occurring during the welding work from many years of experience. The abnormal situation is, for example, a case where an opening of the groove or a welding groove slightly deviates from the design or has an irregular shape.

The skilled worker is excellent not only in situation determination of the abnormal situation but also in the dexterity of the hand unconsciously memorized by the body. For example, the skilled worker preferentially melts a wall surface by slightly swinging the torch, exquisitely changes the height of the torch to reduce the heat input, or once cuts off the arc and then restarts.

A technique of such a skilled worker is dark cognition that is difficult to be verbalized, quantified, or systematically classified. Thus, in the welding robot system of the present embodiment, since teaching can be performed by a motion instead of words, "dark cognition" in which the skilled worker unconsciously performs an optimal motion can be directly reflected in the control of the robot 33.

The present invention is not limited to the aforementioned embodiment, and includes various modification examples. For example, the aforementioned embodiment is described in detail in order to facilitate easy understanding of the present invention, and are not limited to necessarily include all the described components.

Furthermore, some of the components of a certain embodiment can be substituted into the components of another embodiment, and the components of another embodiment can be added to the component of a certain embodiment.

Furthermore, another component can be added, removed, and substituted to, from, and into some of the components of the aforementioned embodiment. A part or all of the aforementioned configurations, functions, processing units, and processing means may be realized by hardware by being designed with an integrated circuit, for example.

Each of the aforementioned configurations and functions may be realized by software by interpreting and executing a program that realizes each function by the processor.

Information of programs, tables, files, and the like for realizing the functions can be stored in a recording device such as a memory, a hard disk, or a solid state drive (SSD), or a recording medium such as an integrated circuit (IC) card, an SD card, or a digital versatile disc (DVD).

Furthermore, control lines and information lines illustrated are considered to be necessary for the description, and not all the control lines and information lines in a product are necessarily illustrated. Almost all the configurations may be considered to be actually connected to each other.

Furthermore, communication means connecting the devices is not limited to a wireless LAN, and may be changed to a wired LAN or other communication means.

REFERENCE SIGNS LIST 10 simulation unit
11 state output unit
11D display
11H headphone
11V VR goggle
12 simulated environment 12B virtual welding situation
12T welding table
13 worker
13a arm of worker
14 motion sensor
14b simulated torch
14c motion camera
14m simulated torch marker
14n simulated torch tip
14sw simulated torch switch
20 master unit (welding control device)
21 state sensor
21C molten pool camera
21L laser displacement meter
21LB laser beam
21M sound sensor
22 real environment
22B actual welding situation
22v robot power supply
23 robot (first welding robot)
23a robot arm
23T robot torch
24 motion control unit
25 welding DB
30 subsystem unit
31 state sensor
32 real environment (second real environment)
33 robot (second welding robot)
34 motion control unit (second motion control unit)
35 welding DB

The invention claimed is:

1. A welding control device, comprising:
a welding DB in which prescribed motion data associated with an object to be welded is stored;
a state sensor which measures, as welding state data, a situation of welding by a robot which executes welding in a real environment according to the prescribed motion data;
a simulated environment which imitates the real environment and notifies a worker of the welding state data; and
a motion control unit which receives, as an input, worker motion data indicating a motion of welding by the worker from the simulated environment, operates the robot in the real environment by using the worker motion data instead of the prescribed motion data, and records, as new prescribed motion data, the input worker motion data in the welding DB,
wherein the motion control unit controls the robot by switching between an automatic mode of controlling the robot in accordance with prescribed motion data previously stored, and a manual mode of controlling the robot in accordance with worker motion data input in real time.

2. The welding control device according to claim 1, wherein the state sensor includes a molten pool camera which captures a molten pool formed in a welded portion as a result of the performed welding, and a captured image of the molten pool is displayed in the simulated environment of the worker.

3. The welding control device according to claim 1, wherein the state sensor includes a laser displacement meter which applies a laser beam to a welded portion which is a location of a welding target and measures, as the welding state data, a shape of the welded portion.

4. The welding control device according to claim 1, wherein the state sensor includes a sound sensor for collecting, as the welding state data, welding sound generated during welding in the real environment, and the welding sound is reproduced in the simulated environment of the worker.

5. The welding control device according to claim 1, wherein the motion control unit extracts a feature value from the welding state data recorded by the state sensor, records the feature value in association with a shape of the object to be welded in the welding DB, and sets a predetermined numerical range to the feature value.

6. A welding robot system comprising a robot which executes a plurality of welding tasks,
wherein a first welding robot includes the welding control device according to claim 1, the welding control device setting the prescribed motion data to the first welding robot, and
a second welding robot includes a second motion control unit which is connected to the welding control device and executes welding in a second real environment by using the prescribed motion data set to the first welding robot.

7. The welding robot system according to claim 6, wherein the second motion control unit extracts a feature value of the welding state data obtained on the second real environment, and corrects a three-dimensional motion of the second welding robot in a direction in which the feature value approaches a predetermined numerical value when the extracted feature value exceeds a predetermined numerical range.

8. The welding robot system according to claim 7, wherein the second motion control unit extracts, as the feature value of the welding state data, a feature value of a shape of a molten pool from a captured image of the molten pool, and corrects a three-dimensional motion of the second welding robot such that the extracted feature value of the shape of the molten pool falls in the predetermined numerical range.

9. The welding robot system according to claim 6, wherein the real environment in which the first welding robot executes welding and the simulated environment in which the worker inputs the worker motion data are constructed in places different from each other, and both the real environment and the simulated environment are connected via a network.

10. A welding control method, wherein
a welding control device includes a welding DB, a state sensor, a simulated environment, and a motion control unit, and
the method comprises:
storing prescribed motion data associated with an object to be welded in the welding DB;
measuring, by the state sensor, as welding state data, a situation of welding by a robot which executes welding in a real environment according to the prescribed motion data;
notifying a worker of the welding state data in the simulated environment which imitates the real environment; and
receiving, by the motion control unit, as an input, worker motion data indicating a motion of welding by the worker from the simulated environment, operating the robot in the real environment by using the worker motion data instead of the prescribed motion data, and recording, as new prescribed motion data, the input worker motion data in the welding DB,
wherein the motion control unit controls the robot by switching between an automatic mode of controlling the robot in accordance with prescribed motion data previously stored, and a manual mode of controlling the robot in accordance with worker motion data input in real time.

* * * * *